US009496702B2

(12) United States Patent
Dong et al.

(10) Patent No.: US 9,496,702 B2
(45) Date of Patent: Nov. 15, 2016

(54) METHOD AND SYSTEM FOR CONTROL AND PROTECTION OF DIRECT CURRENT SUBSEA POWER SYSTEMS

(71) Applicant: General Electric Company, Schenectady, NY (US)

(72) Inventors: Dong Dong, Schenectady, NY (US); Luis Jose Garces, Niskayuna, NY (US); Rixin Lai, Clifton Park, NY (US); Song Chi, Clifton Park, NY (US); Maja Harfman Todorovic, Niskayuna, NY (US); Di Zhang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 553 days.

(21) Appl. No.: 13/941,657

(22) Filed: Jul. 15, 2013

(65) Prior Publication Data

US 2015/0015066 A1 Jan. 15, 2015

(51) Int. Cl.
*H02J 1/00* (2006.01)
*H02J 3/00* (2006.01)
*H02H 3/16* (2006.01)
*H02J 3/36* (2006.01)
*E21B 41/00* (2006.01)

(52) U.S. Cl.
CPC ............ *H02H 3/16* (2013.01); *E21B 41/0085* (2013.01); *H02J 3/36* (2013.01); *H02J 2003/365* (2013.01); *Y02E 60/60* (2013.01); *Y10T 307/305* (2015.04)

(58) Field of Classification Search
USPC .............................. 307/11, 82, 151; 323/311
See application file for complete search history.

(56) References Cited

U.S. PATENT DOCUMENTS

| 3,530,362 A | | 9/1970 | Filimonov et al. |
|---|---|---|---|
| 4,639,846 A | * | 1/1987 | Dahler ...................... H02J 3/36 363/37 |
| 7,633,770 B2 | | 12/2009 | Datta et al. |
| 7,851,943 B2 | | 12/2010 | Datta et al. |
| 7,880,419 B2 | | 2/2011 | Sihler et al. |
| 8,044,537 B2 | | 10/2011 | Asplund et al. |
| 2003/0016073 A1 | * | 1/2003 | Gelman ........... H03K 17/08144 327/447 |

(Continued)

FOREIGN PATENT DOCUMENTS

| DE | 2451940 | * | 5/1975 |
|---|---|---|---|
| DE | 2451940 A1 | | 5/1975 |

(Continued)

OTHER PUBLICATIONS

Bahrman et al., "The ABCs of HVDC transmission technologies", vol. No. 4, pp. 32-44, Mar. 31, 2007.*

(Continued)

*Primary Examiner* — Rexford Barnie
*Assistant Examiner* — Xuan Ly
(74) *Attorney, Agent, or Firm* — Armstrong Teasdale LLP

(57) ABSTRACT

A method and a high-voltage DC (HVDC) power system are provided. The system includes a plurality of sending-end (SE) modules coupled in electrical series and divided into at least two groups that each operate independently with respect to an electrical ground and a plurality of receiving-end (RE) power converter modules electrically coupled to the plurality of SE modules, the plurality of RE power converter modules including a fast ground-fault detection and control device, the plurality of RE power converter modules including a receiving-end front-end DC-DC converter controller, and an output current damping control.

21 Claims, 13 Drawing Sheets

(56) References Cited

U.S. PATENT DOCUMENTS

| | | | |
|---|---|---|---|
| 2008/0252142 A1 | 10/2008 | Davies et al. | |
| 2008/0284249 A1* | 11/2008 | Datta | H02J 1/06 307/36 |
| 2010/0046255 A1 | 2/2010 | Paajarvi | |
| 2010/0133901 A1* | 6/2010 | Zhang | H02M 5/458 307/11 |
| 2012/0217802 A1 | 8/2012 | Kanakasabai et al. | |
| 2012/0268099 A1 | 10/2012 | Sihler et al. | |

FOREIGN PATENT DOCUMENTS

| | | |
|---|---|---|
| EP | 0868002 B1 | 12/2008 |
| EP | 2067313 B1 | 6/2009 |
| GB | 1492181 A | 11/1977 |

OTHER PUBLICATIONS

Tang et al., (Locating and Isolating DC Faults in Multi-Terminal DC Systems, vol. No. 22, pp. 1877-1884, Jul. 31, 2007.*

European Search Report and Written Opinion issued in connection with corresponding EP Application No. 14176708.7-1804 dated Mar. 11, 2015.

Bahrman et al., "The ABCs of HVDC transmission technologies", IEEE Power and Energy Magazine, vol. No. 4, Issue No. 2, pp. 32-44, Mar. 31, 2007.

Tang et al., "Locating and Isolating DC Faults in Multi-Terminal DC Systems", IEEE Transactions on Power Delivery, vol. No. 22, Issue No. 3, pp. 1877-1884, Jul. 31, 2007.

Okba et al., "Harmonics in HVDC Links, part II Effects and reduction techniques", IECON 2012—38th Annual Conference on IEEE Industrial Electronics Society, IEEE, pp. 1328-1336, Oct. 25, 2012.

* cited by examiner

METHOD AND SYSTEM FOR CONTROL AND PROTECTION OF DIRECT CURRENT SUBSEA POWER SYSTEMS

STATEMENT REGARDING FEDERALLY SPONSORED RESEARCH & DEVELOPMENT

The U.S. Government has certain rights in this invention as provided for by the terms of Contract No. DE-AC-07NT42677.

BACKGROUND OF THE DISCLOSURE

This description relates to power distribution systems, and, more particularly, to systems and methods for a high-voltage direct current (HVDC) transmission and distribution system control and protection.

As oil and gas fields in shallow waters go dry, producers are tapping offshore fields in deeper waters with oil installations that operate far below the surface of the sea. The typical equipment for such subsea oil recovery and production include gas compressors and various pumps for multiple functions. Electric variable speed drive (VSD) and motor systems are one way to power such equipment directly under the deep water. Therefore, the delivery of electric power from a remote onshore utility grid or power generation is important to secure a reliable production and processing of oil and gas in subsea locations. Typically, the transmission power requirement is approximately one hundred megawatts for medium to large oil/gas fields.

For applications wherein bulk power is transmitted over long distances to offshore locations, alternating current (AC) transmission faces technical challenges, which becomes more significant when transmission distance is in excess of one-hundred kilometers. The significant reactive power drawn from the distributed subsea cable capacitors restrains the power delivery capability as well as increases the system cost.

Direct current (DC) transmission is more efficient over longer distances than AC transmission. Medium voltage (MV) or high voltage (HV) DC transmission typically requires power electronic converters which are capable of converting between HV AC and HV DC. In conventional converter topologies, each switch of the converter is designed to handle high voltages which may range from tens of kilovolts to hundreds of kilovolts depending upon the application needs. Such switches are typically arranged with series connection of several semiconductor devices such as insulated gate bipolar transistors (IGBTs) and thyristors. Another method is to use switches within modules of lower voltage rating and achieving the high voltages required by connecting as many modules in series as the application requires. Due to the special application in subsea, receiving-end converters need to be designed on a modular-basis which is easy to transport, marinize, install, and retrieve.

BRIEF DESCRIPTION OF THE INVENTION

In one embodiment, a high-voltage DC (HVDC) power system includes a plurality of sending-end (SE) modules coupled in electrical series and divided into at least two groups that each operate independently with respect to an electrical ground and a plurality of receiving-end (RE) power converter modules electrically coupled to the plurality of SE modules, the plurality of RE power converter modules including a fast ground-fault detection and control device, the plurality of RE power converter modules including a receiving-end front-end DC-DC converter controller, and an output current damping control.

In another embodiment, a method of high voltage DC (HVDC) power system control and protection includes coupling a plurality of loads to a receiving end (RE) power distribution system, the RE power distribution system configured as a plurality of monopole distribution systems configured to operate independently with respect to a ground, each of the plurality of loads coupled to a branch of the RE power distribution system through a respective load distribution cable and a respective RE load power conversion module. The method further includes detecting a ground fault in a branch, closing a bypass switch across conductors of the load distribution cable associated with the branch to bypass load current from the branch, ramping down current in an associated monopole distribution system, opening a ground fault isolation switch when the monopole distribution system current is approximately zero, and ramping the current in the associated monopole distribution system to supply other loads in the monopole distribution system while the ground fault affected branch is isolated.

In yet another embodiment, a subsea receiving end (RE) assembly of a high-voltage DC (HVDC) power system includes a plurality of receiving-end (RE) power converter module branches coupled in electrical series and having associated load segment distribution protective devices, each RE power converter module supplying a respective load with three-phase alternating current (AC) power for each branch of loads, each load segment including a fast ground-fault detection system including a first current sensor configured to measure load current entering a load distribution cable, a second current sensor configured to measure load current entering a RE power converter module downstream from the load distribution cable, a ground fault detector configured to compare a residual common mode current measured by the first and second current sensors to a threshold and generate a ground fault command, and a load isolation device configured to isolate a ground fault from the HVDC power system based on the generated ground fault command.

BRIEF DESCRIPTION OF THE DRAWINGS

FIG. 1 is a schematic block diagram of a bipolar current-source based modular stack direct current (MSDC) high voltage direct current (HVDC) system and sending-end control scheme.

FIG. 2 is a schematic block diagram of another embodiment of a bipolar current-source based modular stack direct current (MSDC) high voltage direct current (HVDC) system and sending-end control scheme.

FIG. 3 is a schematic block diagram of a sending-end control system, such as, the first controller or second controller shown in FIGS. 1 and 2 in accordance with an example embodiment of the present disclosure.

FIG. 4 is a schematic diagram of an equivalent circuit of sending-end system configured as two independent current sources.

FIG. 5 is a schematic block diagram of a ground fault detection and isolation system for bipolar current-source based modular stack direct current systems.

FIG. 6 is a flow diagram of a method of detecting and isolating a ground fault in system.

FIG. 7 is a schematic block diagram of a portion of the system shown in FIGS. 1 and 2 illustrating a ground fault location.

FIG. 8 is a graph of residual common-mode current from the GF detector shown in FIG. 5 on the inlet of a distribution cable.

FIG. 9 is a graph of residual common-mode current from GF detector shown in FIG. 5 on the inlet of receiving-end module.

FIG. 10 is a graph illustrates the effects of a ground fault transient on system.

FIG. 11 is a schematic diagram of a receiving end front-end DC-DC converter and controller with an additional output current damping control circuit.

FIG. 12 is a graph of resonance current that may be present in a branch of the system shown in FIG. 1.

FIG. 13 is a graph 1300 of overshoot current as a result of a current spike due to the load-shedding of other neighbor loads.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE INVENTION

The following detailed description illustrates embodiments of the invention by way of example and not by way of limitation. It is contemplated that the invention has general application to embodiments of controlling and protecting power systems in various applications.

Specifically, this invention disclosure includes the bipolar system architecture, the control of sending-end topside power conversion station for bipolar operation, the control of receiving-end power converter modules with current resonance damping, the distribution switchyard bypass protection structure, and the means of fast ground-fault detection and isolation.

The following description refers to the accompanying drawings, in which, in the absence of a contrary representation, the same numbers in different drawings represent similar elements.

The whole sending-end modules of those aforementioned MSDC in patents are controlled as a single current source. The system is poised to operate only when the full system is built, thereby prolonging the construction and commissioning time. Any fault may jeopardize the whole system operation, reducing the system reliability. The system flexibility is restricted due to the single operation mode. The high-impedance grounding scheme, as shown in the aforementioned patents, results in the case that the subsea cables need a full-voltage or even higher insulation capability to sustain the ground fault transient. In addition, the ground fault is not easy to detect due to the limited ground fault current.

In its simple embodiment of this invention disclosure, the bipolar modular stack system architecture and the corresponding sending-end control are proposed with more flexibility of operation modes, such as monopole and bipolar modes. System can tolerate the single transmission cable failure. Switchyard structure and the fast but accurate ground fault protection solution are proposed, which provide a ride-through capability during ground-fault event. An active current damping controller is proposed for the receiving-end modules for a robust distribution system operation.

Figure 1:
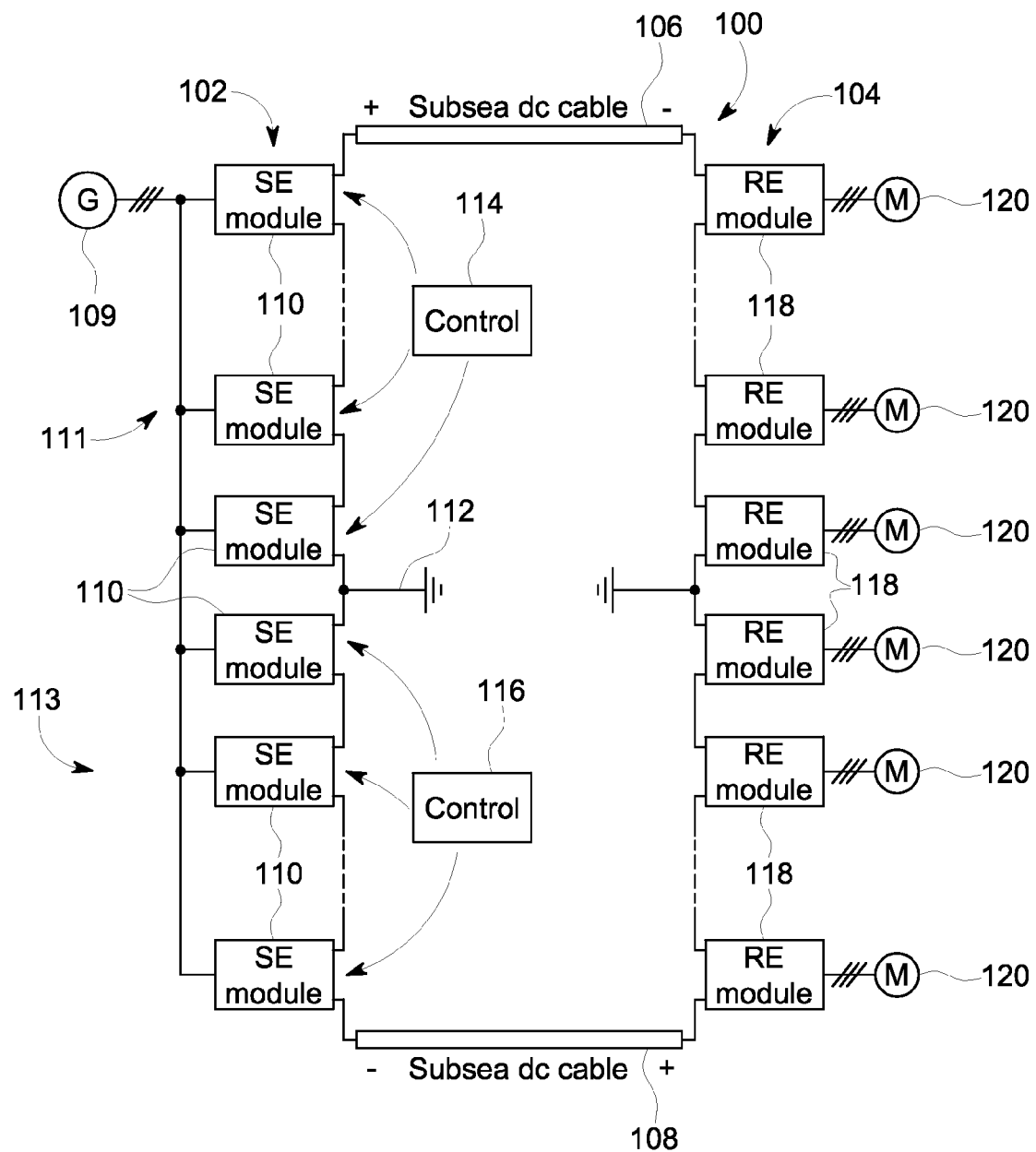
FIGS. 1-13 show exemplary embodiments of the method and apparatus described herein.

FIG. 1 is a schematic block diagram of a bipolar current-source based modular stack direct current (MSDC) high voltage direct current (HVDC) system 100 and sending-end control scheme. In the example embodiment, system 100 includes a sending end 102 and a receiving end 104. Sending end 102 and receiving end 104 are electrically coupled using a first cable 106 having a first polarity and a second cable 108 having an opposite second polarity. In the example embodiment, Sending end 102 is positioned above the surface of a body of water and receiving end 104 is positioned near a floor of the body of water and therefore typically operates in a submerged pressure environment.

Sending end 102 includes a generator 109 and a plurality of sending end modules 110 configured in electrical series. Modules 110 are electrically divided into, in the example of FIG. 1, two groups 111 and 113 by a ground 112. In the example illustrated in FIG. 2, modules 110 are electrically divided into two groups by a low resistance conduit 202, such as, but, not limited to a wire or cable.

Sending end 102 includes two sets of identical unipolar 12-pulse rectifier/inverter systems using modules 110. They operate independently with respect to ground. The polarities of cables 106, 108 are opposite. During normal operation, the current flowing through the earth ground is negligible due to the symmetrical operation. The use of a bipolar system over a unipolar system includes, for example, when a fault occurs, with the earth return electrodes installed at each end of the system, approximately half the rated power can continue to flow using the earth as a return path, operating in monopolar mode.

Figure 2:
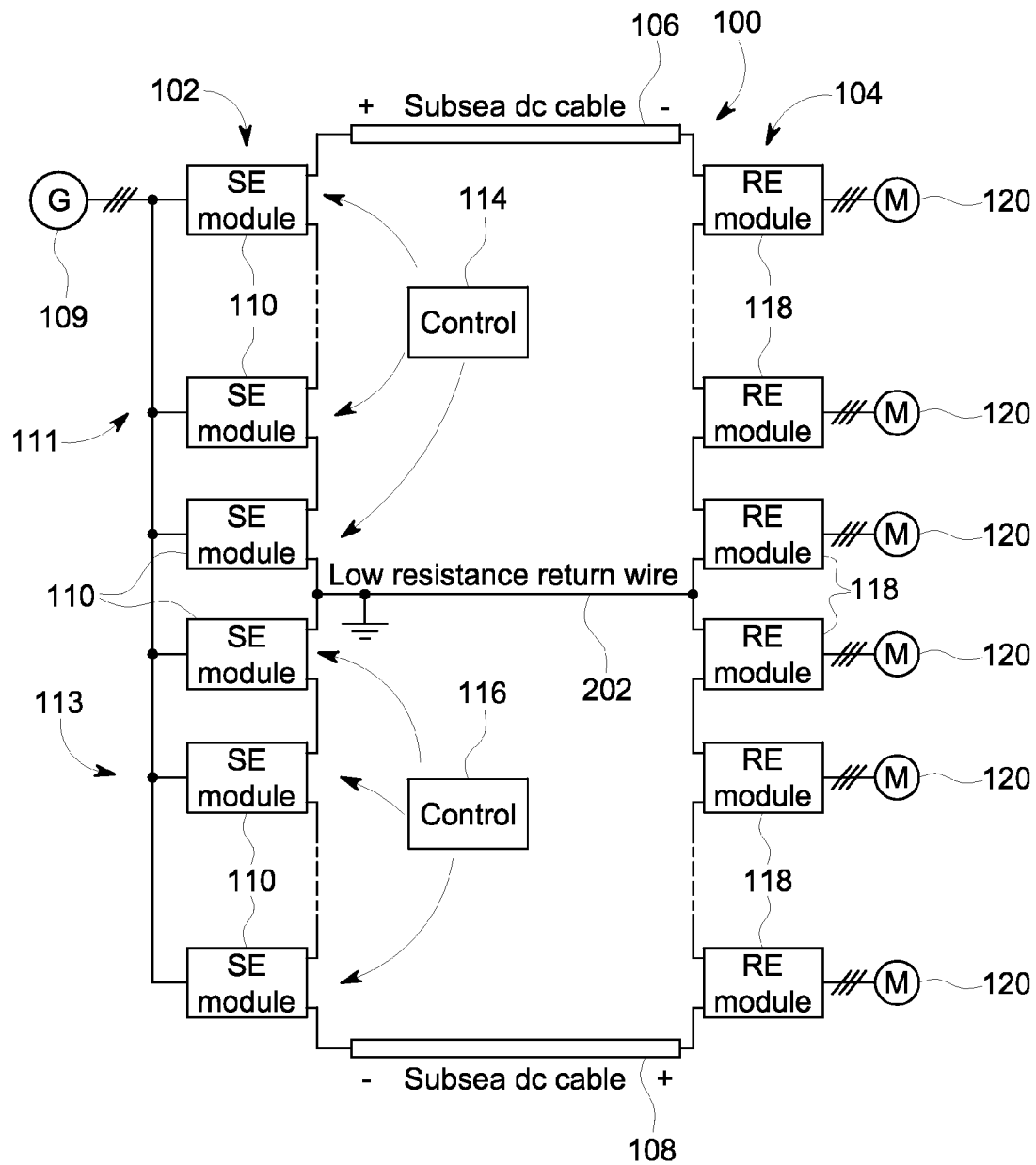

The sending-end modules are split into two groups by the location of the earthing electrode and are controlled separately using a first controller 114 and a second controller 116. First controller 114 and second controller 116 regulate the two groups of sending-end converters 110 as two identical current sources. Such control also ensures the ground current always approximately zero. Their output terminal voltage levels depend on the loading conditions of receiving-end 104. The voltages of groups 111 and 113 adjust automatically in accordance with a load condition. Therefore, the system 100 doesn't necessarily require a symmetrical loading of receiving-end 104. FIG. 2 shows an alternative way of using low-insulation metallic return wire to conduct current instead of seawater or earth ground. The system illustrated in FIG. 2 is more feasible when it is difficult to build an earthing system in subsea area.

Receiving end 104 includes a plurality of receiving end modules 118 electrically coupled in a series configuration. In various embodiments, each receiving end module 118 supplies a single load, such as, but, not limited to a motor 120. Moreover, receiving end units 118 include a first stage DC-DC converter and a second stage DC-AC inverter (neither shown in FIGS. 1 and 2).

Figure 3:
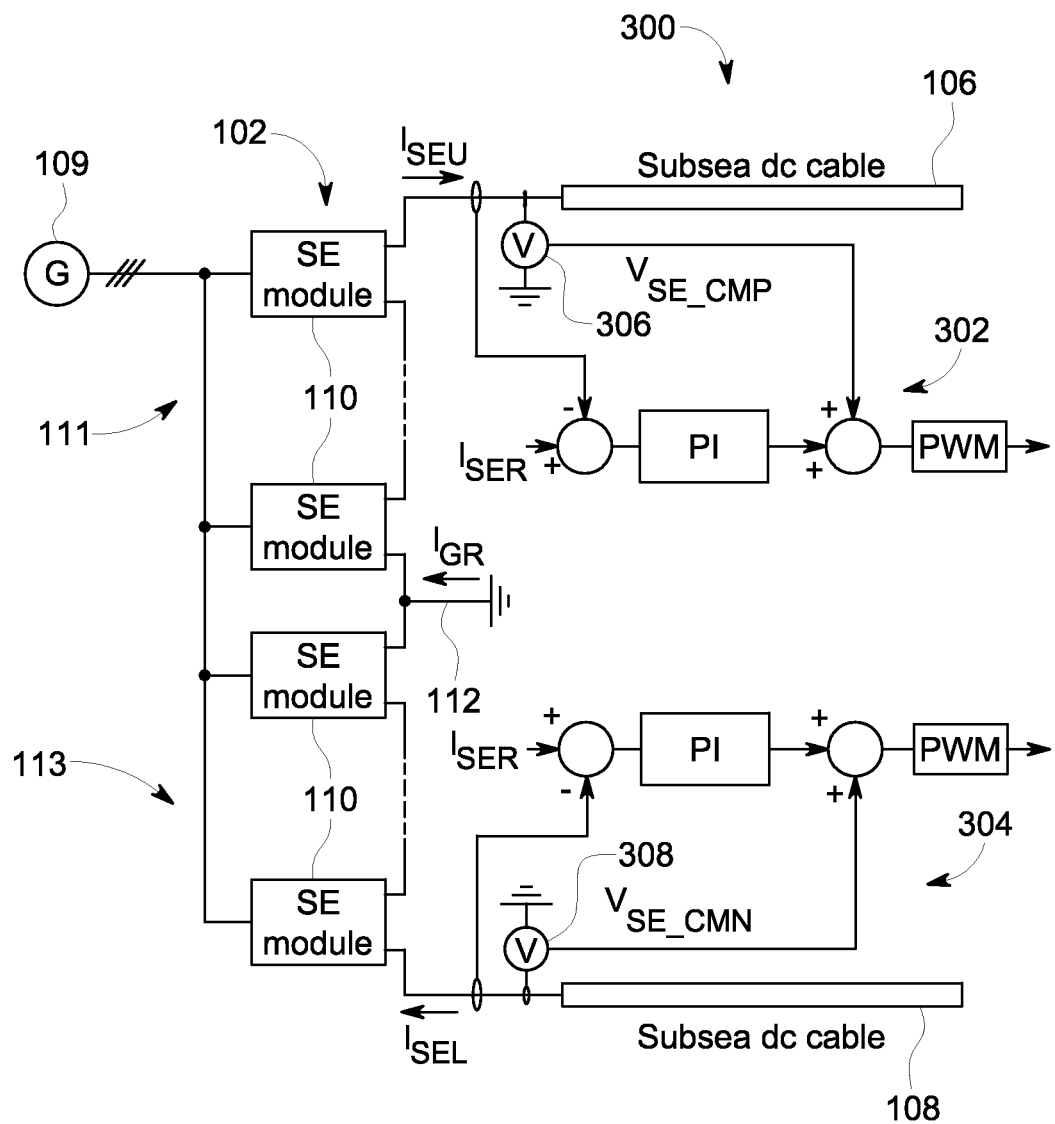

FIG. 3 is a schematic block diagram of a sending-end control system 300, such as, first controller 114 or second controller 116 (shown in FIGS. 1 and 2) in accordance with an example embodiment of the present disclosure. In the example embodiment, sending-end control system 300 includes two sets of current and voltage measurement systems 302 and 304. Two voltage sensors 306 and 308 measure the voltage between cables 106 and 108, respectively and ground. Interleaving techniques among sending-end (SE) modules in each group 111 and 113 are implemented to reduce the link current ripple. The output current from group 111 converters and group 113 converters can be further interleaved to completely cancel out the earth current.

Figure 4:
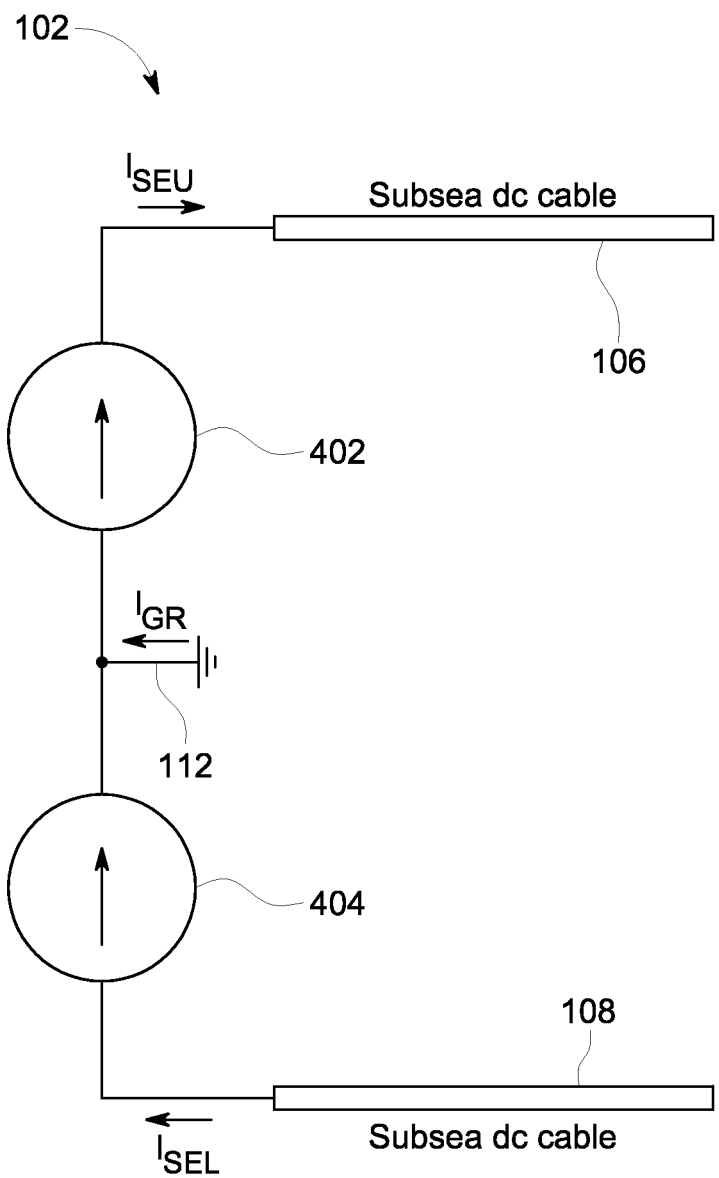

FIG. 4 is a schematic diagram of an equivalent circuit of sending-end system 102 configured as two independent current sources 402 and 404. System 100 is a bipolar MSDC, subsea system installation, initially commissioned as a bipolar system, but may be operated in a monopole mode. Therefore, the system can operate as soon as only half of the system is built, thereby shortening the commissioning time by half. Under the monopole mode, two subsea cables can be used as sending and returning path, or two cables can be paralleled as the sending path and the seawater or metallic wire is used as the return path.

The bipolar scheme of system 100 essentially operates as two parallel monopoles. Any system fault can only jeopardize half of the total load. The other half system can keep operation as the monopole mode. Due to the nature of two independent power delivery operations, system 100 can still keep alive even when one of the subsea transmission cables breaks. The system flexibility and reliability is thus improved significantly.

Additionally, system 100 permits reducing an insulation strength of transmission and distribution cables and connectors, which can be guaranteed always less than half of the total DC voltage, even in the case of ground faults. This reduces the dielectric stress on cable and connectors.

Figure 5:
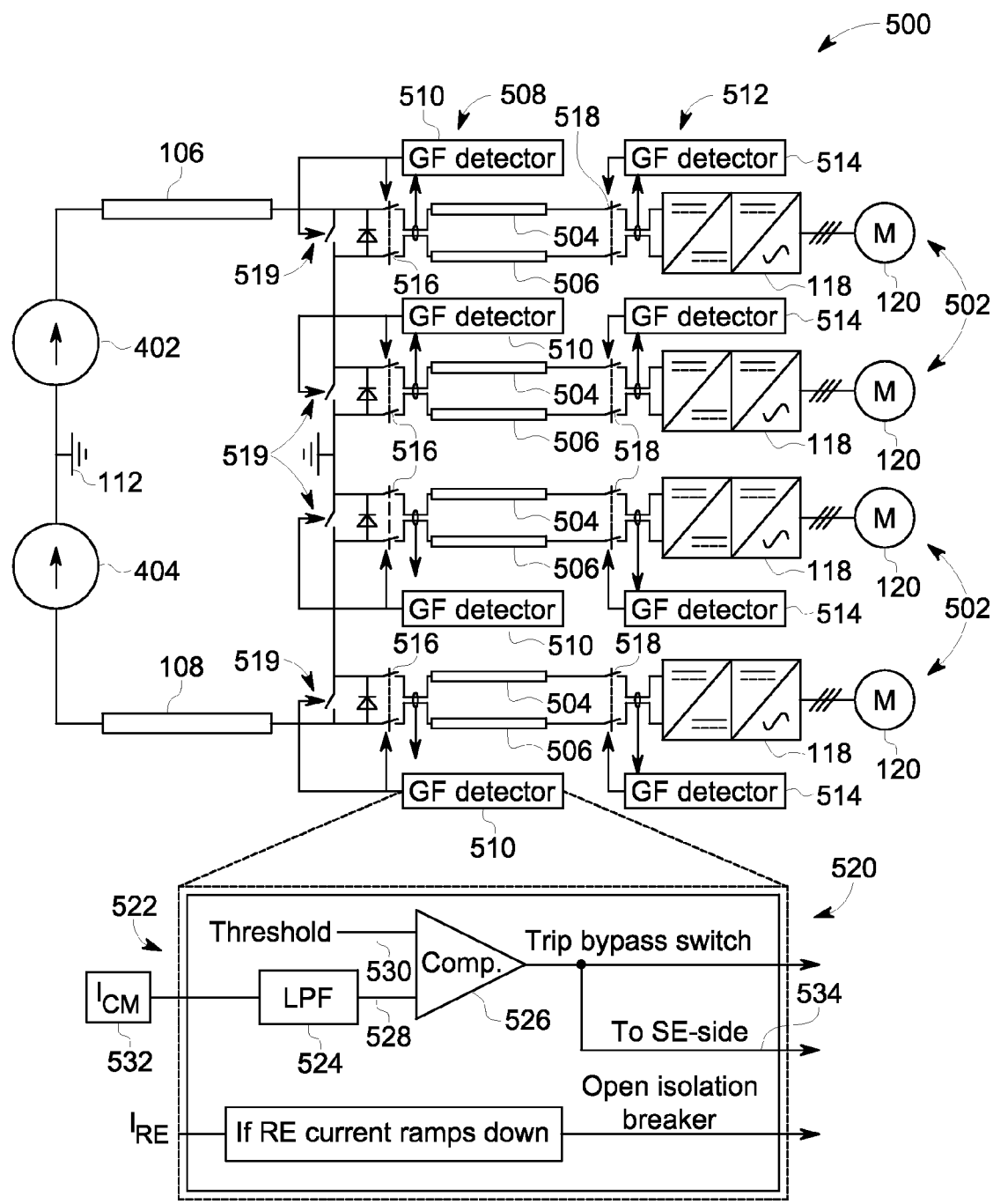

FIG. 5 is a schematic block diagram of a ground fault detection and isolation system 500 for bipolar current-source based modular stack direct current systems, such as, system 100. Insulation failure or ground fault on cables and connectors is one of the more significant component failure modes in such HVDC system due to the harsh environment. A fast detection of ground fault, an accurate positioning of fault location, and a simple way of fault clearing are important. Ground fault (GF) detection and isolation system 500 for system 100 is illustrated using four receiving-end modules 118. Each branch 502 includes load 120 supplied by a respective receiving end module 118. Each branch is supplied by an inlet distribution cable 504 and an outlet distribution cable 506. At each end of cables 504 and 506 a ground fault detector is electrically coupled to branch 502. For example, a supply-side 508 of cables 504 and 506 includes a supply-side ground fault detector 510 and a load-side 512 of cables 504 and 506 includes a load-side ground fault detector 514. Additionally, each branch 502 includes a ground fault isolation switch on a supply-side of each ground fault detector 510 and 514. Specifically, ground fault detectors 510 are associated with an isolation switch 516 and ground fault detectors 514 are associated with an isolation switch 518. Each branch also includes a branch bypass switch 519. As shown in an expanded view 520 of ground fault detectors 510, each ground fault detector 510 includes a current sensing circuit 522 including a low-pass filter 524 and a comparator 526. Comparator receives a signal 528 representative of the current flowing though cables 504 and 506 on supply-side 508 and a threshold signal representing a predetermined amount of current flow that would be apparent in a ground fault condition. In various embodiments, current sensing circuit 522 includes current sensors 532, such as, but, not limited to, residual hall-effect current sensors to detect the current flowing through cables 504 and 506.

The residual hall-effect current sensors are implemented in the inlet of distribution cable and inlet of the VSD module 118 in each load branch 502. GF detectors 510 and 514 compare the residual common-mode current with threshold 530 to determine the occurrence of ground fault. GF detectors 510 and 514 are capable of identifying the ground fault locations directly and controlling the local isolation breakers 516 or 518 to isolate the faulty portion of the affected branch 502 from the whole of system 100. Upon detection of a ground fault, GF detectors 510 and 514 simultaneously transmit a trip signal 533 to bypass switch 519 to bypass current around the affected branch 502 and transmit a fault signal 534 to sending-end 102, which then ramps down the output current of the faulty side of the monopole system. Once the link current drops below a predetermined limit, GF detectors 510 and 514 open the associated isolation breaker 516 or 518 and let the sending-end 102 ramp up the current again.

Figure 6:
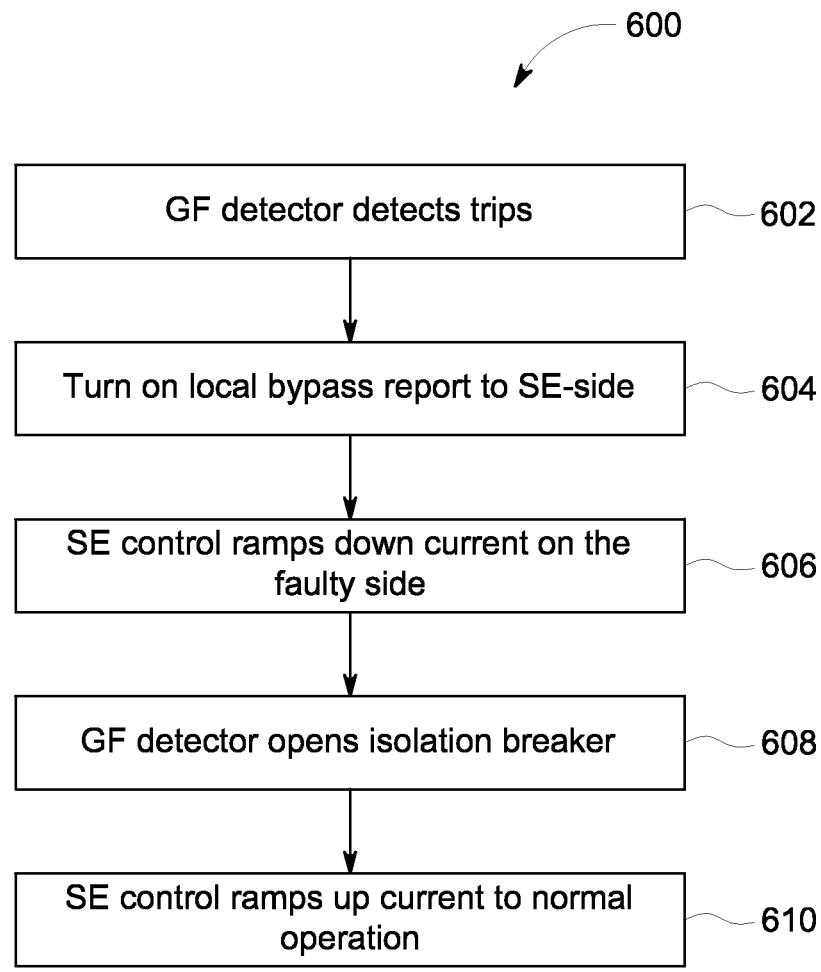

FIG. 6 is a flow diagram of a method 600 of detecting and isolating a ground fault in system 100. The complete chain of GF detection, positioning, and isolation can be accomplished autonomously. The loss of production due to the ground fault can be thereby minimized within a very short time slot. The faulty branch or portion of a branch can be detected and isolated quickly, ensuring the continuous operation of the rest of the system. In the example embodiment, method 600 includes detecting 602 the ground fault, simultaneously closing 604 the branch bypass switch and transmitting a ground fault signal to a respective sending end controller 114 or 116, ramping-down 606 the current in the affected monopole by the respective sending end controller 114 or 116, opening 608 the associated isolation breaker when current in the branch decreases to a predetermined value, and ramping-up 610 the current in the affected monopole back to a normal operational level for the existing load on the monopole.

Figure 7:
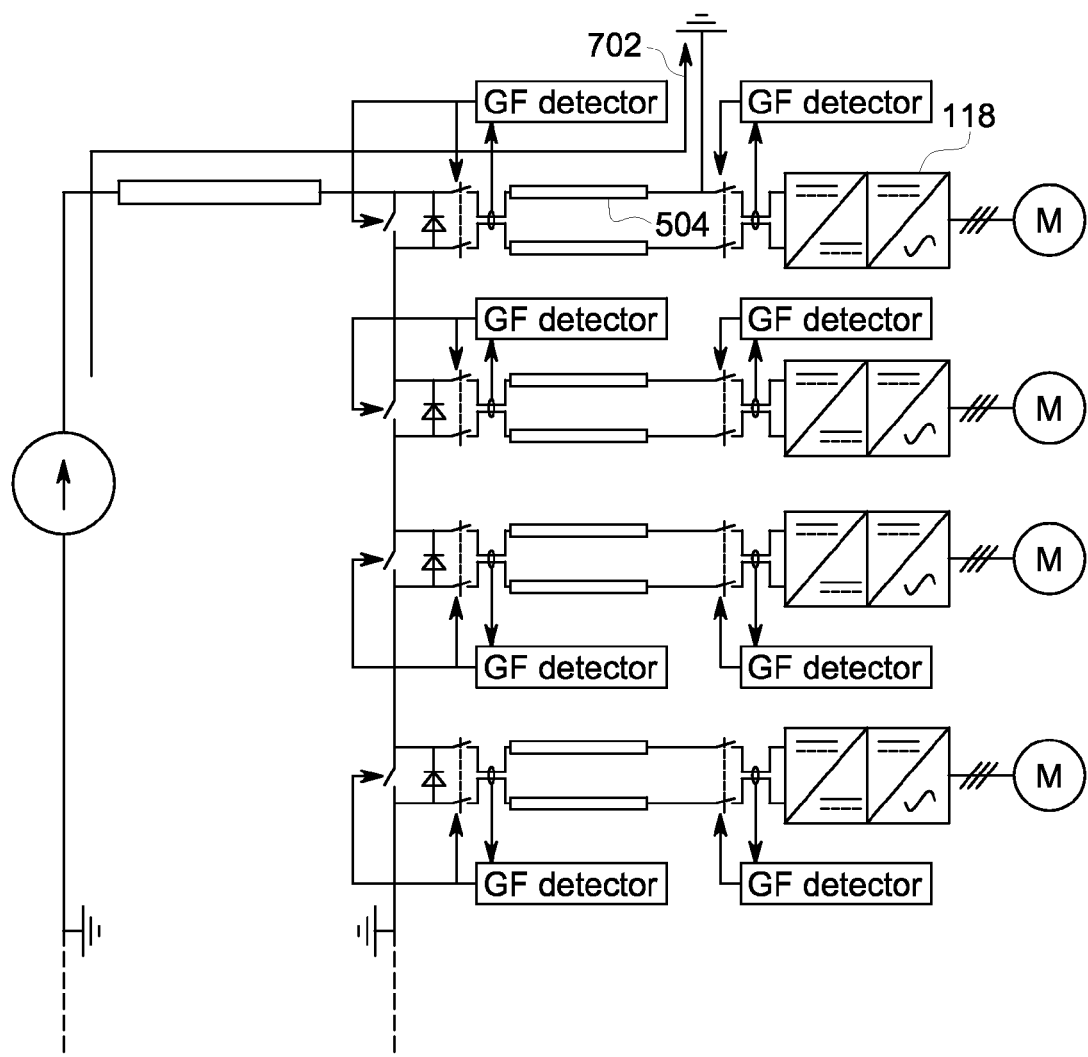

FIG. 7 is a schematic block diagram of a portion of system 100 illustrating a ground fault location 702 on a wet-met connector between the distribution cable 504 and one of the plurality of receiving end modules 118, as indicated.

Figure 8:
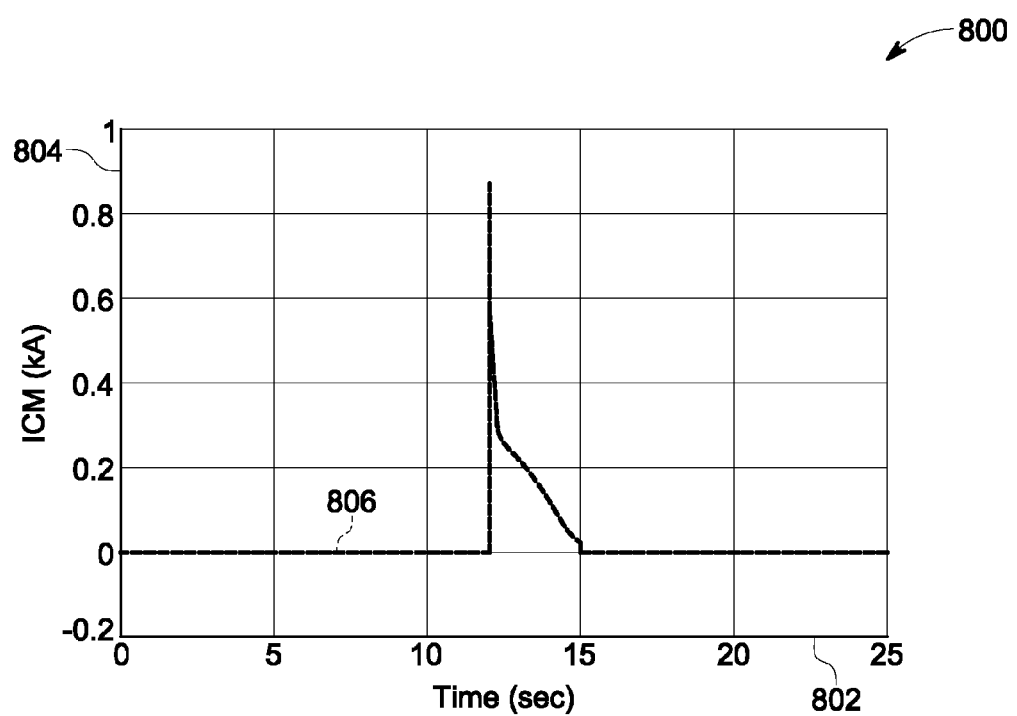

FIG. 8 is a graph 800 of residual common-mode current from GF detector 510 on the inlet of distribution cable 504. Graph 800 includes an x-axis 802 graduated in units of time (seconds) and a y-axis 804 graduated in units of current (kA). A trace 806 illustrates the current detected by GF detector 510 on the inlet of the distribution cable.

Figure 9:
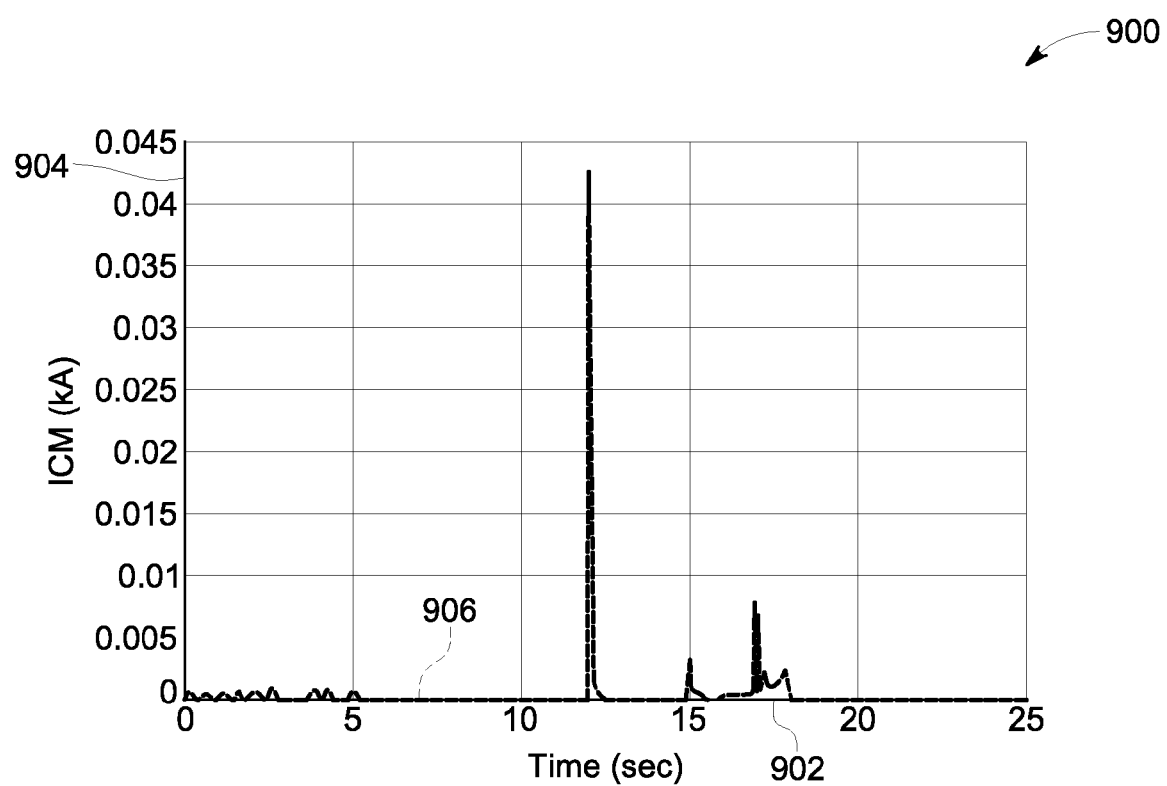

FIG. 9 is a graph 900 of residual common-mode current from GF detector 514 on the inlet of receiving-end module 118. Graph 900 includes an x-axis 902 graduated in units of time (seconds) and a y-axis 904 graduated in units of current (kA). A trace 906 illustrates the current detected by GF detector 514 on the inlet of receiving-end module 118. Comparing the residual common-mode current of the two adjacent GF detectors 510 and 514 shows that the location of the fault to be on the distribution cable. Trace 806 shows a spike of approximately 900 Amps and at approximately the same time trace 906 shows a spike of only 43 Amps.

Figure 10:
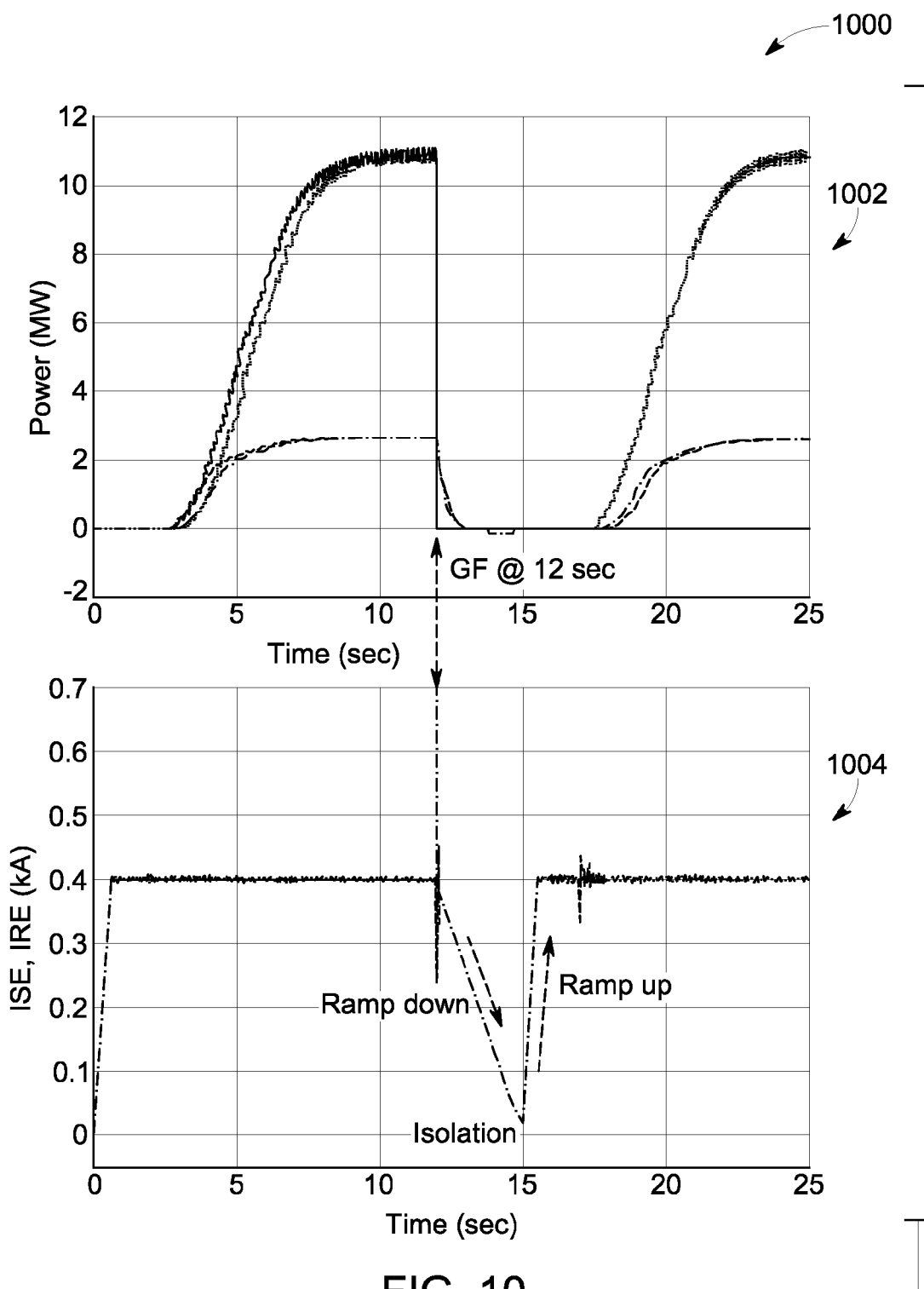

FIG. 10 is a graph 1000 illustrates the effects of a ground fault transient on system 100. Graph 1000 shows an upper plot 1002 and a lower plot 1004 where upper plot 1002 shows the output power of four receiving end modules 118 representing two 11 MW compressor loads and two 2.5 MW pump loads. Lower plot 1004 shows the sending-end and receiving-end link current. As the ground fault occurs at t=12 seconds, the affected sending-end controller decreases the link current to approximately zero right after receiving the fault signal from the associated GF detector. The GF detector opens the isolation breaker as soon as the current drops to a predetermined or minimum value. Then the link current is controlled back to the normal value. The unaffected receiving-end modules 118 return back to the normal state after the ground fault detection and isolation process.

Figure 11:
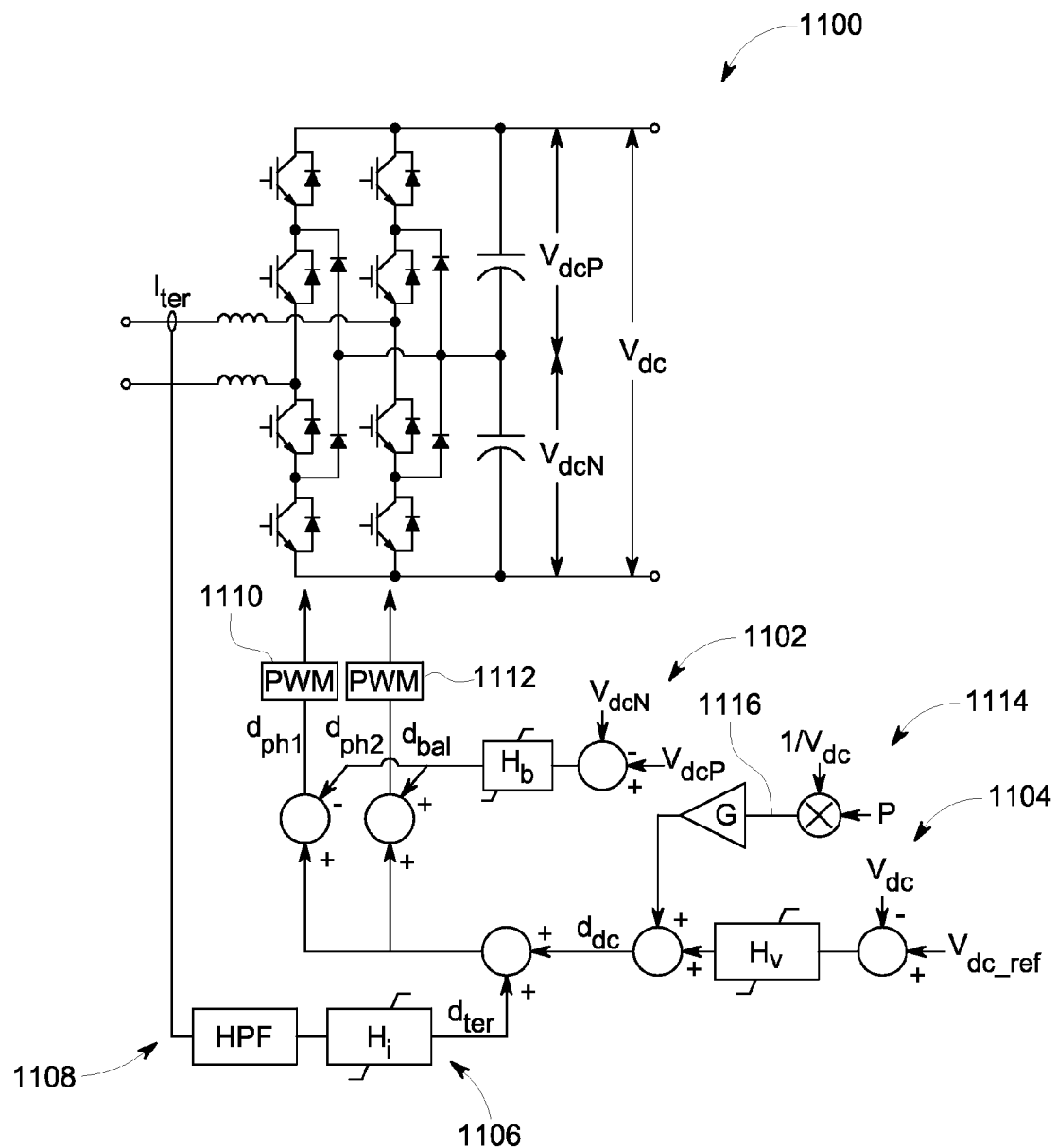

FIG. 11 is a schematic diagram of a receiving end front-end DC-DC converter 1101 and controller 1100 with an additional output current damping control circuit 1102. Although the sending-end current is regulated, the receiving-end current is rich in current spikes and oscillations due to various impedance resonances from the transmission and distribution cables and the low control bandwidth of the sending-end. At least some known transient events, such as the sudden load shedding, can easily trigger the receiving-end current oscillation or overshoot. These abnormal current behaviors may trip the protection function in any of receiving end modules 118 as well as leading to more power losses. Receiving-end front-end DC-DC converter controller 1100 includes a balance regulator circuit 1102, a power regulator circuit 1104, and an additional output current damping control circuit 1106 having a receiving-end current measurement circuit 1108. Circuit 1108 includes a high-pass-filter (HPF) that reduces a DC component of the current signal. The other frequency information flows through the regulator (Hi) and generates the corresponding duty-cycle signal dter. The output of current damping control circuit 1106 automatically adjusts the terminal voltage to damp out the current oscillation and spike. Because the damping loop only copes with the non-DC current, it will not affect power regulator circuit 1104.

Balance regulator circuit 1102 is configured to balance a voltage across each of a top capacitor, VdcP and a bottom capacitor, VdcN. Ideally, VdcP and VdcN will be equal, however there may be some difference between components or between capacitors resulting in a voltage difference. To overcome that difference, balance regulator circuit 1102 controls the two capacitor voltages to be the same.

Power regulator circuit 1104 is configured to generate a duty cycle control signal for each phase of pulse width modulators 1110 and 1112. A reference voltage Vdc_ref is compared to the measurement DC voltage Vdc, which generates an error signal input to controller Hv to generate the PWM duty cycle. To increase a response of controller Hv a feed forward loop 1114 is used.

Feed forward loop 1114 receives a power signal P and the measured Vdc. Power, P is the load side power consumption, which is divided by the Vdc, which generates a corresponding current reference 1116. Current reference 1116 is scaled by a predetermined gain factor, G. The voltage signal from controller Hv and scaled current reference are combined to generate the duty cycle ddc. Feed forward loop 1114 helps correct a sudden change on the load side, which can create a sudden change on the power. The sudden change of power can suddenly change the duty cycle too quickly for the Hv controller to maintain a proper output.

Figure 12:
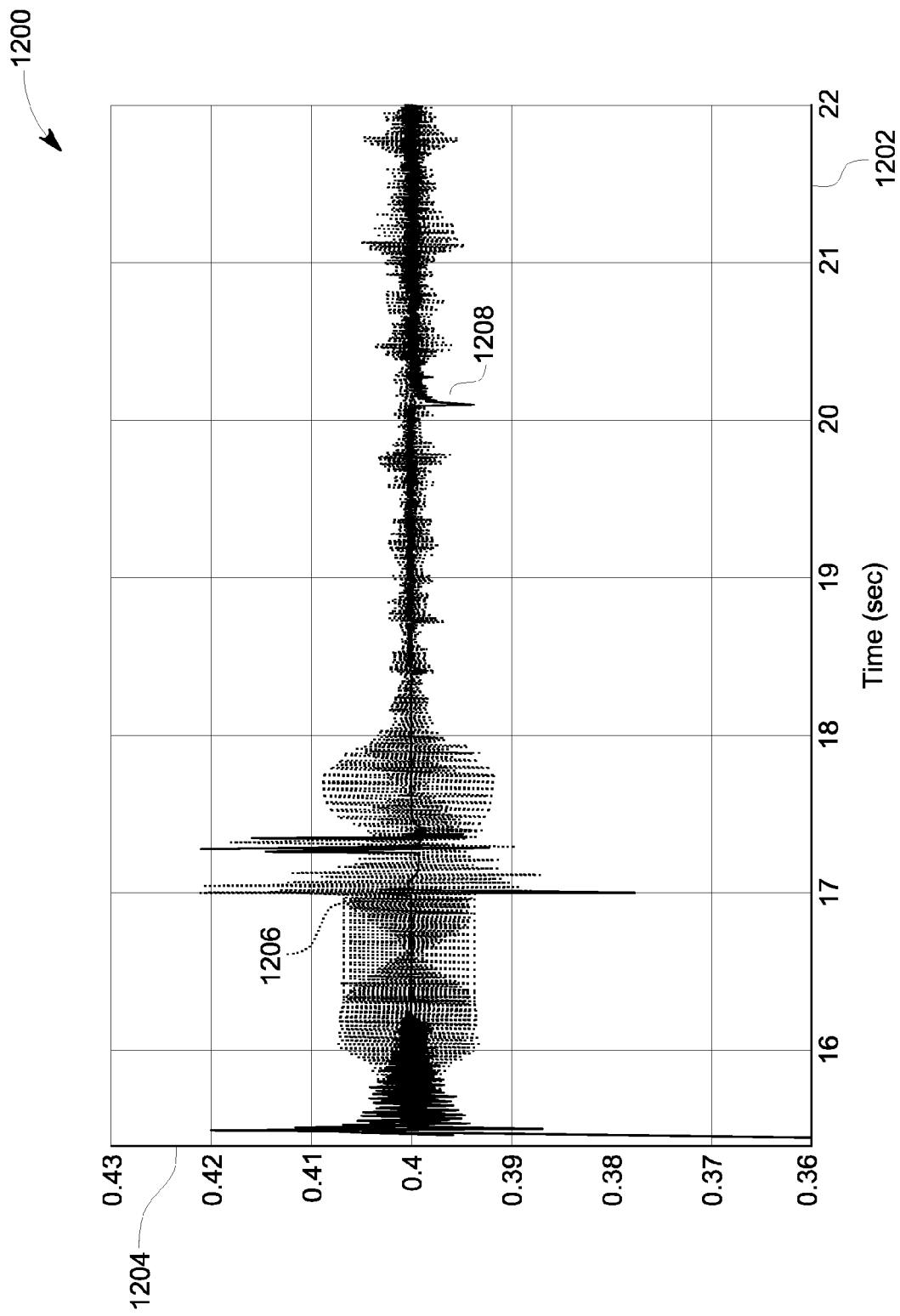

FIG. 12 is a graph 1200 of resonance current. Graph 1200 includes an x-axis 1202 graduated in units of time (seconds) and a y-axis 1204 graduated in units of current. A trace 1206 illustrates the current of receiving end module 118 without circuit 1106 and a trace 1208 illustrates the current with circuit 1106.

Figure 13:
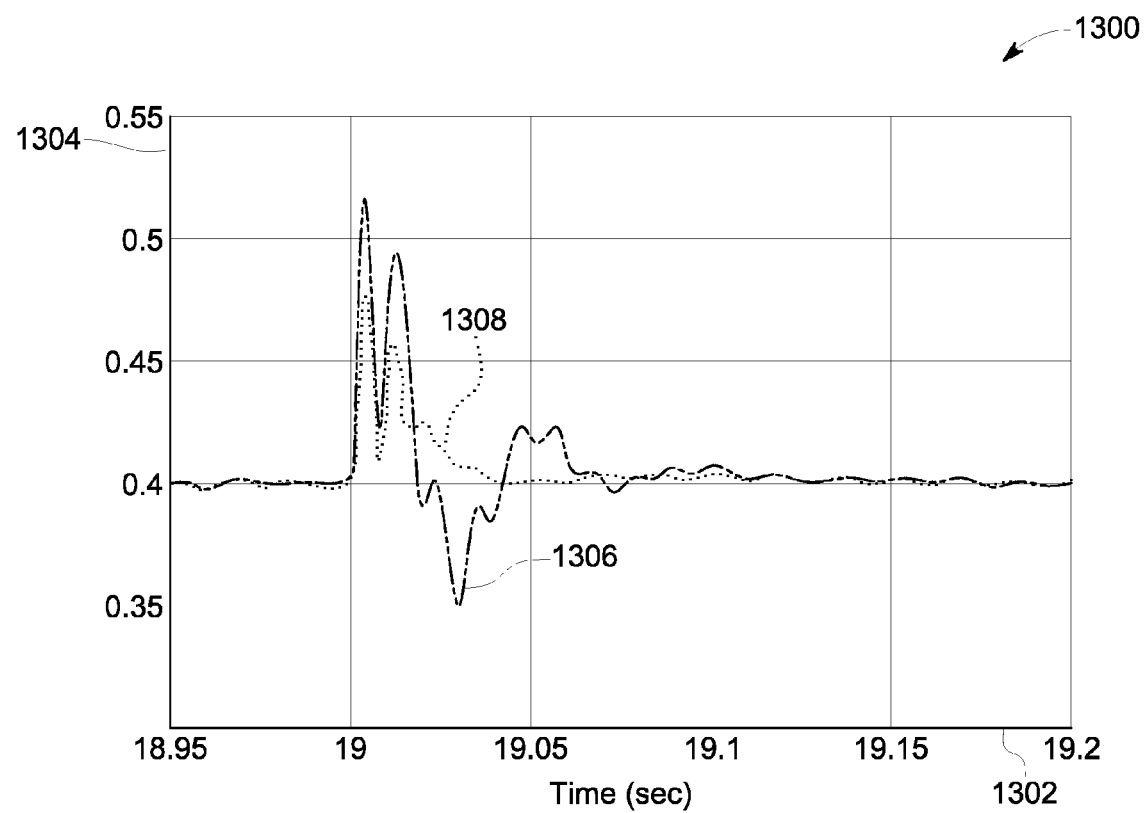

FIG. 13 is a graph 1300 of overshoot current as a result of a current spike due to the load-shedding of other neighbor loads. Graph 1300 includes an x-axis 1302 graduated in units of time (seconds) and a y-axis 1304 graduated in units of current. A trace 1306 illustrates the current of receiving end module 118 without circuit 1106 and a trace 1308 illustrates the current with circuit 1106.

The above-described embodiments of a method and system of controlling and protecting a surface to subsea power transmission and distribution system provides a cost-effective and reliable means for providing a redundant, fault-tolerant, and reliable using a bipolar topology, fast-acting ground fault detection and isolation system and a current damping system. More specifically, the bipolar topology described herein facilitates supplying electrical power from a surface location to a harsh subsea location. As a result, the methods and systems described herein facilitate operate remote equipment in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A high-voltage DC (HVDC) power system comprising:
a plurality of sending-end (SE) modules coupled in electrical series and divided into at least two groups that each operate independently with respect to an electrical ground;
a plurality of receiving-end (RE) power converter modules electrically coupled to said plurality of SE modules, the plurality of RE power converter modules comprising:
a fast ground-fault detection and control device;
a receiving-end front-end DC-DC converter controller; and
an output current damping control comprising a receiving-end current measuring loop; and
at least two SE control systems, each SE control system of said at least two SE control systems configured to regulate each group of said at least two groups to facilitate maintaining a substantially zero amp ground current, wherein said fast ground-fault detection and control device is configured to simultaneously transmit a fault signal to at least one SE control system of said at least two SE control systems.

2. The system of claim 1, wherein said HVDC power system further comprises a bipolar configuration having an earth ground and two opposite polarity transmission cables supplying said RE power converter modules from said SE modules.

3. The system of claim 1, wherein said HVDC power system further comprises a bipolar configuration having a low impedance metallic wire return and two opposite polarity transmission cables supplying said RE power converter modules from said SE modules.

4. The system of claim 1, wherein said HVDC power system further comprises a monopolar configuration having two transmission cables in electrical parallel supplying said RE power converter modules from said SE modules and at least one of a low impedance metallic wire return and an earth ground.

5. The system of claim 1, wherein said plurality of receiving-end (RE) power converter modules further comprises one or more ground fault detector devices implemented in each terminal of a switchyard configuration to facilitate identification of a ground fault location.

6. The system of claim 1, wherein said receiving-end current measuring loop comprises:
   a high-pass-filter configured to eliminate a direct current component of the current; and
   a regulator configured to generate a corresponding duty-cycle signal configured to modify the duty cycle of a first stage DC-DC converter of the RE power converter modules.

7. The system of claim 1, wherein said receiving-end front-end DC-DC converter controller comprises:
   a receiving-end front-end DC-DC converter;
   a receiving-end front-end DC-DC controller; and
   a current reference circuit configured to generate a current reference signal based on a ratio of electrical power through said receiving-end front-end DC-DC converter, a voltage across an output of said receiving-end front-end DC-DC converter, and a reference voltage.

8. A method of high voltage DC (HVDC) power system control and protection, said method comprising:
   coupling a plurality of loads to a receiving end (RE) power distribution system, the RE power distribution system configured as a plurality of monopole distribution systems configured to operate independently with respect to a ground, each load of the plurality of loads coupled to a branch of the RE power distribution system through a respective load distribution cable and a respective RE load power conversion module;
   measuring a first current of the load at an inlet of the associated load distribution cable;
   measuring a second current of the load at an inlet of the associated RE load power conversion module;
   detecting a ground fault in the branch;
   closing a bypass switch across conductors of the load distribution cable associated with the branch to bypass load current from the branch;
   ramping down current in an associated monopole distribution system;
   opening a ground fault isolation switch when the monopole distribution system current is approximately zero; and
   ramping the current in the associated monopole distribution system to supply other loads in the monopole distribution system while the ground fault affected branch is isolated.

9. The method of claim 8, wherein detecting a ground fault in the branch comprises:
   comparing a residual common mode current of the first and second currents to a threshold; and
   determining a ground fault and location based on the comparison.

10. The method of claim 8, wherein ramping down current in an associated monopole distribution system comprises ramping down the output of a monopole system of a sending end power distribution system.

11. The method of claim 8, wherein opening a ground fault isolation switch when the monopole distribution system current is approximately zero comprises opening a ground fault isolation switch upstream of the load distribution cable to isolate the respective load distribution cable and the respective RE load power conversion module from the RE power distribution system.

12. The method of claim 8, wherein opening a ground fault isolation switch when the monopole distribution system current is approximately zero comprises opening a ground fault isolation switch upstream of the respective RE load power conversion module to isolate the respective RE load power conversion module from the RE power distribution system.

13. The method of claim 8, further comprising coupling a plurality of sending-end (SE) modules in electrical series and divided into at least two groups that each operate independently with respect to an electrical ground.

14. The method of claim 8, further comprising automatically adjusting a terminal voltage of the RE load power conversion module to damp current oscillations and spikes.

15. The method of claim 14, further comprising measuring a receiving-end current using a high-pass-filter configured to eliminate a direct current component of the current and a regulator configured to generate a corresponding duty-cycle signal.

16. The method of claim 8, further comprising:
   coupling the receiving end (RE) power distribution system to a plurality of sending-end (SE) modules coupled together in electrical series and divided into at least two groups that each operate independently with respect to an electrical ground using a pair of opposite polarity transmission cables; and
   operating the HVDC power system in a bipolar mode where current through the HVDC power system is balanced such that an approximately zero amp current flows through a system ground connection.

17. The method of claim 8, further comprising coupling a system ground connection between the receiving end (RE) power distribution system and the plurality of sending-end (SE) modules through earth.

18. The method of claim 8, further comprising coupling a system ground connection between the receiving end (RE) power distribution system and the plurality of sending-end (SE) modules through a low-impedance wired connection.

19. A subsea receiving end (RE) assembly of a high-voltage DC (HVDC) power system, said assembly comprising:
   a plurality of receiving-end (RE) power converter module branches coupled in electrical series and comprising an associated load segment comprising an RE power converter module, a load, a load distribution cable, and load segment distribution protective devices, each RE power converter module branch of said plurality of RE power converter module branches supplying a respective load with three-phase alternating current (AC) power for each branch of loads, said associated load segment comprising:
      a fast ground-fault detection system comprising:
         a first current sensor configured to measure load current entering said load distribution cable;
         a second current sensor configured to measure load current entering said RE power converter module downstream from said load distribution cable;
         a ground fault detector configured to compare a residual common mode current measured by said first and second current sensors to a threshold and generate a ground fault command; and
      a load isolation device configured to isolate a ground fault from the HVDC power system based on the generated ground fault command, wherein the HVDC power system includes a sending-end (SE) system, said ground fault detector further configured to simultaneously transmit a fault signal to an SE controller, said SE controller configured to ramp down an output current of the faulted side of the SE system.

20. The system of claim 1, wherein each SE control system of said at least two SE control systems comprises:
 a first measurement system coupled to one group of said at least two groups and configured to measure an electrical current and a voltage with respect to the electrical ground, wherein each RE power converter module of the plurality of RE power converter modules comprises a load distribution cable.

21. The system of claim 20, wherein said fast ground fault detection and control device comprises:
 a first current sensor configured to measure load current entering said load distribution cable;
 a second current sensor configured to measure load current entering said RE power converter module downstream from said load distribution cable;
 at least one ground fault detector configured to compare a residual common mode current measured by said first and second current sensors to a threshold and generate a ground fault command; and
 a load isolation device configured to isolate a ground fault from said HVDC power system based on the generated ground fault command.

* * * * *